Figure 1:
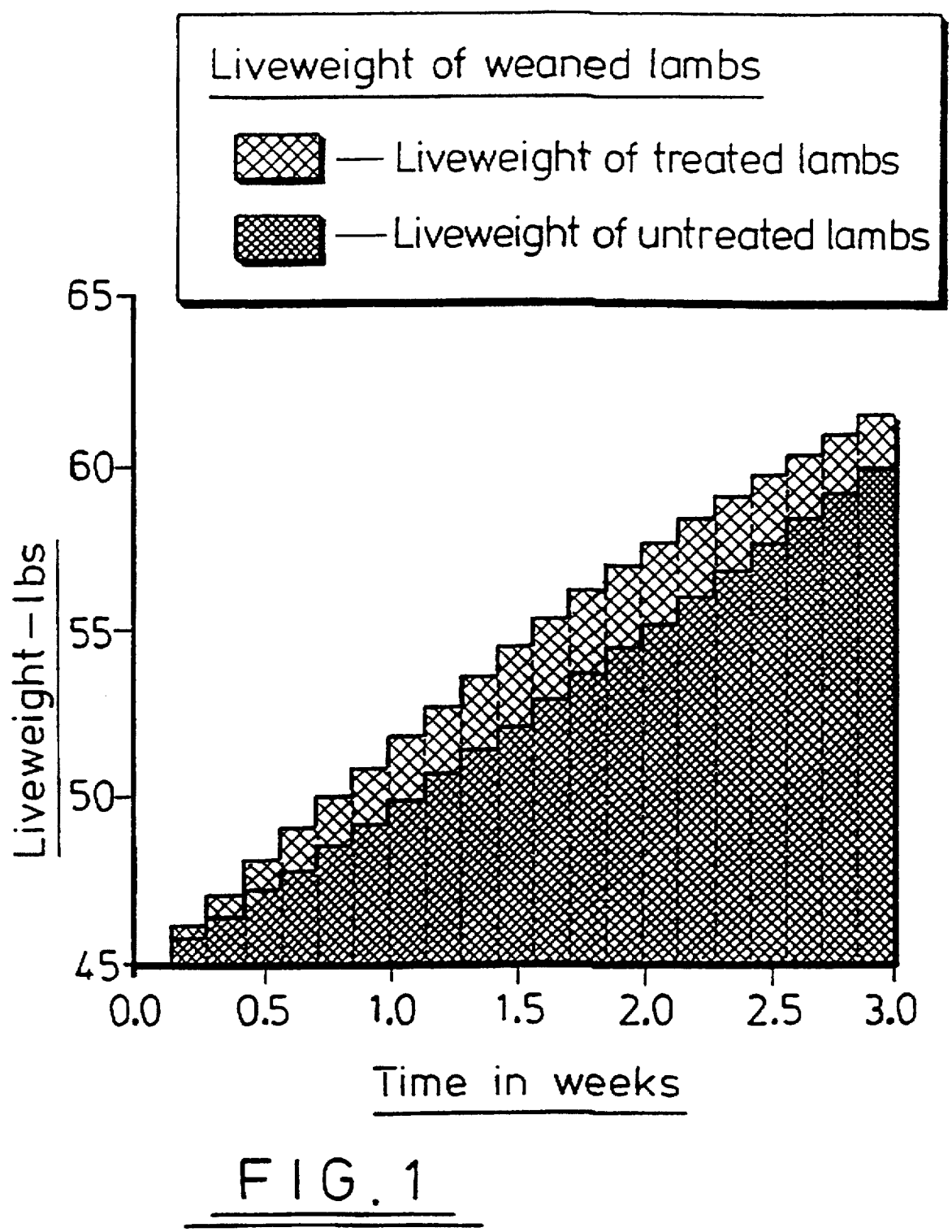

United States Patent [19]

Garnett

[11] Patent Number: 5,759,537
[45] Date of Patent: Jun. 2, 1998

[54] ANIMAL FEEDS

[75] Inventor: David Garnett, Aberystwyth, United Kingdom

[73] Assignee: Lovesgrove Research Limited, Aberystwyth, Wales

[21] Appl. No.: 535,080

[22] PCT Filed: Apr. 7, 1993

[86] PCT No.: PCT/GB93/00736

§ 371 Date: Nov. 30, 1995

§ 102(e) Date: Nov. 30, 1995

[87] PCT Pub. No.: WO94/22324

PCT Pub. Date: Oct. 13, 1994

[51] Int. Cl.$^6$ .............. A23J 1/16; A23K 1/165; A23K 7/00
[52] U.S. Cl. .............. 424/93.43; 424/439; 424/442; 424/94.6
[58] Field of Search .............. 424/130, 93.43, 424/439, 442, 94.6

[56] References Cited

U.S. PATENT DOCUMENTS 3,117,866  1/1964  Golub et al. .................. 99/2

FOREIGN PATENT DOCUMENTS

| | | |
|---|---|---|
| 81830139 | 8/1981 | European Pat. Off. . |
| 89123490 | 12/1989 | European Pat. Off. . |
| 90420554 | 12/1990 | European Pat. Off. . |
| 81 15090 | 8/1981 | France . |
| 2 231 198 | 1/1974 | Germany . |

OTHER PUBLICATIONS

Chemical Abstracts, 102(1985) Apr., No. 15, Columbus, Ohio, p. 519.

Jones et al., J. of Animal Science (U.S.), 1992, vol. 70, No. 11, pp. 3473–3482.

Pernas et al., Biochemical and Biophysical Research Communications, 1990, vol. 168, No. 2, pp. 664–650.

Van Nieuwenhuyzen, Journal of the American Oil Chemists Society, vol. 58 (1981) Oct., No. 10, pp. 886–888.

Palmquist et al., J. Dairy Science, 1980, vol. 63, pp. 1–14.

*Primary Examiner*—Lila Feisee
*Assistant Examiner*—Geetha P. Bansal
*Attorney, Agent, or Firm*—Howell & Haferkamp, L.C.

[57] ABSTRACT

An animal feedstuff contains a minor amount of a lysophospholipid that has growth promoting properties when fed to animals. The lysophospholipid is produced from a kit that can be incorporated into an animal feed, where the kit includes a substrate and a bacterial strain that is capable of producing an enzyme capable of converting the substrate into the lysophospholipid.

6 Claims, 2 Drawing Sheets

ANIMAL FEEDS

The present invention is concerned with animal feeds.

Chemical additives to animal feedstuffs have been used for some time as growth promoters or "feed enhancers". Previously this has generally involved the use of synthetically manufactured microbial antibiotics and, in particular, ionophore antibiotics such as Monensin and Avoparcin.

We have now developed non-hormonal, naturally occurring animal feedstuff additives which have growth promoting properties when fed to animals.

According to the present invention there is provided an animal feed comprising an animal feedstuff containing a minor amount of lipophilic, active ingredient comprising at least one phospholipid, which ingredient on introduction into the rumen or stomach of an animal can be incorporated into a rumen or stomach cell membrane so as to increase the porosity of said membrane.

Typically the animal feedstuff additive is in the form of powder incorporated into a feed, capsules or licks; alternatively it may be dissolved in the animal's drinking water.

The active ingredient is preferably in substantially pure form (the words "substantially pure", as used herein serve to distinguish the ingredient from its natural analogue in that the former has been isolated from its natural environment and further processed so as to be suitable for inclusion into the animal feed).

Typically the animal feedstuff is silage, hay, grass, feed concentrates or the like and the active ingredient is preferably included in the animal feed at a level of about 1 to 100 mg/kg of the feedstuff. The quantity of ingredient present in the feed largely depends on the nature of the actual feedstuff used (e.g. for silage or feed concentrates the amount is typically 30 mg/kg dry weight of feedstuff). The additive may be combined with an inert carrier (such as talc) so as to facilitate handling thereof.

There is further provided by the present invention a method of feeding animals which method comprises providing said animals with an animal feed containing a substantially pure, lipophilic, active ingredient as hereinbefore described, such that said additive is introduced into the rumen or stomach of said animal so as to increase the porosity of rumen or stomach cell membranes of said animal.

The ingredient is particularly useful as a growth promoter (as it allows an increase in the uptake of nutrients including essential amino acids and proteins) due to its effect on the membranes found in bacterial cells in the animal gut and on the cells that constitute the lining of the gut itself. The ingredient is generally administered to cattle where it has further been found to increase the production and also the protein content of milk from these animals. The ingredient is not however limited to use with cattle and is also used with other farm livestock such as sheep, goats, swine and poultry.

Preferably the active ingredient comprises one or more isomers of a monoacyl phospholipid, typically of the following general formula:

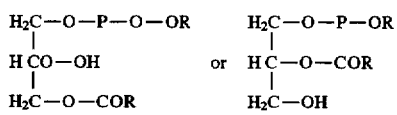

where R is a nitrogenous base or polyol residue, and R' is a saturated or unsaturated fatty acid chain.

A particularly preferred phospholipid is plasmologen lysophosphatidyl choline; other preferred phospholipids include lysophosphatidylethanolamines, lysophosphatidylinositols, lysophosphatidylserines and lysophosphatidic acids. It is of course envisaged that other phospholipid analogues capable of being incorporated into rumen or stomach cell membranes may be used.

The phospholipids present in the feeds according to the present invention are often produced in the pancreas of some animals (including cattle) in small amounts. However, to be effective in increasing the porosity of the cell membranes of the rumen or stomach, the phospholipids are included in the feed according to the present invention at an artificial level over and above that normally existent in the animal.

Alternatively, a substrate which can be converted by enzymic action into the above-mentioned active ingredient may be included in the animal feed. Typically, the substrate is converted into the active ingredient by enzymes produced by bacteria introduced into the animal feed.

There is further provided by the present invention therefore a kit comprising at least one bacterial strain together with a substrate which can be acted on by one or more enzymes produced by said bacteria, said bacteria and said substrate being incorporated into an animal feed for example, as a probiotic, whereby said substrate is convertible into an active ingredient by the action of said enzymes thereon: wherein said active ingredient comprises at least one phospholipid component and which ingredient on introduction into the rumen or stomach of an animal can be incorporated into a rumen or stomach cell membrane so as to increase the porosity of said membrane.

Preferably the bacterial strain is capable of producing the enzyme phospholipase $A_2$; a preferred bacterial strain being *Streptomyces violaceoruber* sp. A preferred substrate is lecithin. Phospholipase $A_2$ chemically removes in situ one of the fatty acid chains of lecithin to give the active phospholipid ingredient. Typically the animal feed is silage and the bacterial strain is preferably included at a level of 100 g per 25 tonnes of the original silage preparation; this level of inclusion gives a satisfactory level of the additive (after fermentation) in the final silage.

In the process of inter-membrane substitution, calcium ions may be displaced by the active ingredient and the phospholipid matrix is expanded. The dose-response to the additive is biphasic in vitro but generally, at higher doses the additive causes a change in the hole size distribution of the membrane (i.e. a change in the number and size of the pores which occur in all membranes at temperatures above absolute zero). At higher doses this expansion can become critical to the viability of the cell due to increased ion efflux from the cell through the treated membrane which following the application of the additive will have a low permeability coefficient. This change is often accompanied by swelling of the cell through influx of osmotically or actively obliged water. Cells with this level of exposure to the additive may irreversibly swell and lyse releasing the cell content into the animal gut. However, at lower doses of the additive, membrane expansion may be such as to decrease the viability of both gram positive and gram negative bacterial cells in the rumen or stomach, which will cause symptomatic changes in the digestion process.

As a result of the preferential effectiveness in destabilising the membranes of gram positive bacteria (due primarily to the relative thinness of their membranes), together with an increased uptake of nutrients and the consequent decrease in acetate to propionate acid ratio, there is an increase in the percentage of protein per unit of milk produced by lactating animals.

There is further provided by the present invention a method of improving the yield and quality of milk produced by lactating animals, which method comprises providing said animals with an animal feed as hereinbefore described such that the active ingredient can be introduced into the rumen or stomach of said animal, whereby the ingredient substantially promotes the uptake of at least amino acids, glucose and fatty acid molecules having a carbon chain of less than 12 carbon atoms from the alimentary tract of said animal, so as to effect an increased yield of milk produced by said animals and wherein said milk comprises a substantially increased protein concentration and substantially increased fat content, compared to milk produced by said animals prior to provision therewith of said ingredient. At the doses envisaged for commercial use of the active ingredient, the latter has a most important effect on the uptake of amino acids, sugars and proteins through the lining of the animal gut as a result of changes in the permeability of the membranes that are active in this process in the gut cells.

In addition, magnesium extraction rates from the rumen or stomach and the other parts of the alimentary tract are improved substantially with low doses of the active ingredient.

The ingredient can also be used in conjunction with other known growth promoters in order to increase the efficiency of these promoters and also (in some embodiments) to lower the dosage of growth promoter administered.

The active ingredient according to the present invention is particularly applicable for use in enhancing the transmission of pharmaceutical and veterinary formulations (such as anti-biotic drugs) across cell membranes of an animal patient. As described above, the active ingredient can increase the efficiency and decrease the dosage of these formulations. There is further provided by the present invention a method of increasing the uptake of pharmaceutical or veterinary formulations, which method involves administering to an animal patient a therapeutically effective amount of the active ingredient as hereinbefore described.

The present invention will now be further illustrated by reference to the following example which does not limit the scope of the invention in any way:

EXAMPLE

Six week old lambs were provided with 0.5 kg/day of a feed containing plasmologen lysophosphatidyl choline, their weight gain was regularly monitored and compared with that of lambs provided with an untreated feed.

Figure 2:
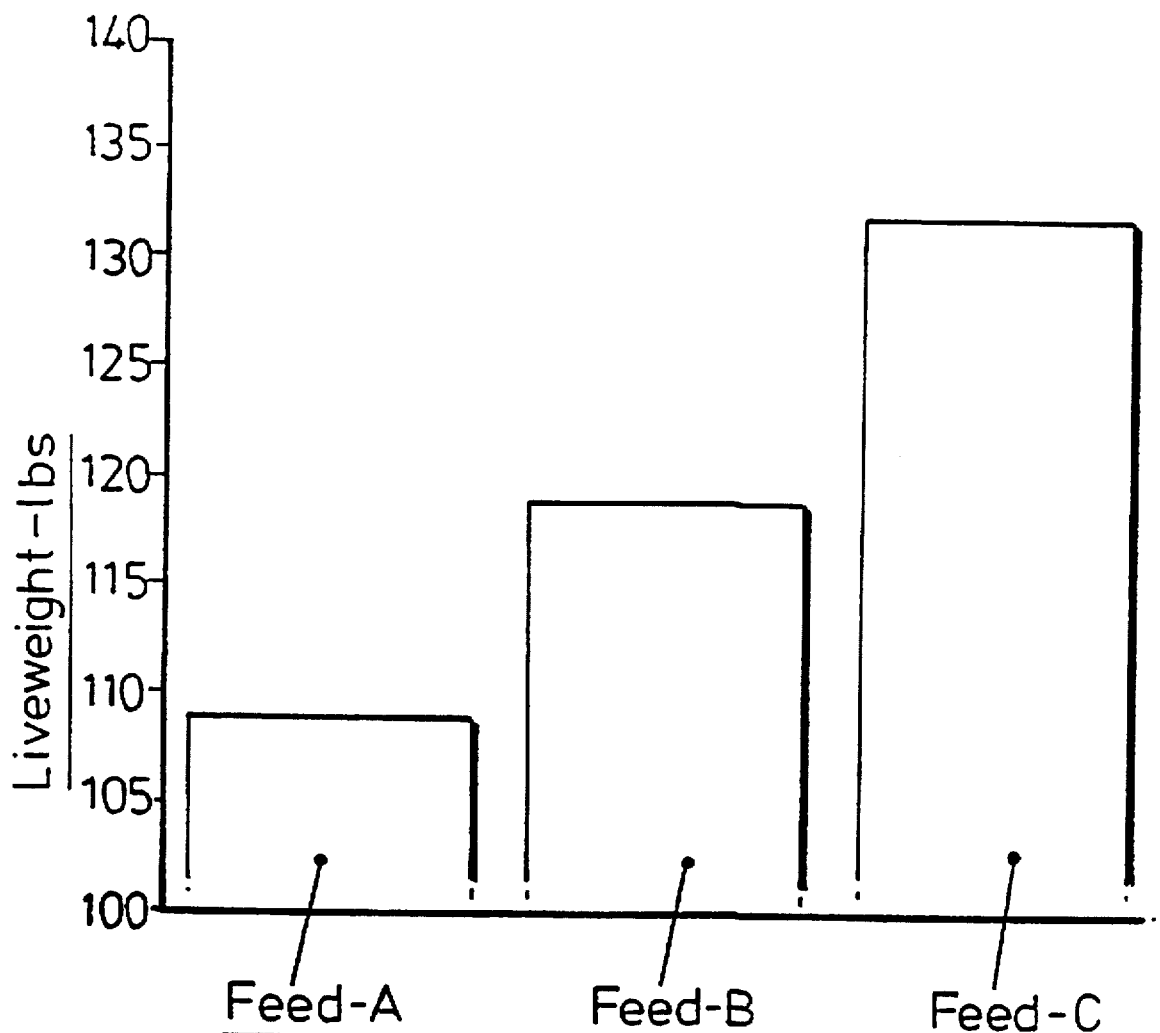

The results are illustrated in the following diagrams wherein:

FIG. 1 shows a comparison of the weight of treated and untreated lambs as measured at regular time intervals; and FIG. 2 shows a comparison of the overall weight gain of lambs fed on (a) untreated feed, (b) a commercially available feed known by the trade name AVOTAN; and (c) a feed according to the present invention. (The overall weight gain being measured over the time scale illustrated in FIG. 1).

As can be seen from the accompanying diagrams the weight gain of lambs provided with a feed according to the present invention was substantially greater than that experienced by the lambs not fed on the present feed.

I claim:

1. A kit comprising at least one bacterial strain together with a substrate, said bacterial strain and said substrate being incorporated into an animal feed, said bacterial strain being capable of producing an enzyme capable of converting said substrate into an active ingredient, wherein said substrate is convertible by the action of said enzyme thereupon into an active ingredient, and wherein the active ingredient is selected from a lysophosphatidylcholine, a lysophosphatidylethanolamine, a lysophosphatidylinositol, a lysophosphatidylserine, or a lysophosphatidic acid.

2. A kit according to claim 1, wherein said enzyme is a phospholipase.

3. A kit according to claim 2, wherein said phospholipase is phospholipase $A_2$.

4. A kit according to claim 3, wherein the bacterial strain comprises *Streptomyces violaceoruber* sp. and is capable of producing phospholipase $A_2$.

5. A kit according to claim 1, wherein said substrate is lecithin.

6. A kit according to claim 4, wherein said substrate is lecithin.

* * * * *